(12) United States Patent
Frei

(10) Patent No.: US 8,218,564 B2
(45) Date of Patent: Jul. 10, 2012

(54) METHOD AND APPARATUS FOR WIFI LONG RANGE RADIO COORDINATION

(75) Inventor: Randall Wayne Frei, San Jose, CA (US)

(73) Assignee: Trilliant Networks, Inc., Redwood City, CA (US)

( * ) Notice: Subject to any disclaimer, the term of this patent is extended or adjusted under 35 U.S.C. 154(b) by 457 days.

(21) Appl. No.: 12/229,867

(22) Filed: Aug. 27, 2008

(65) Prior Publication Data
US 2009/0059794 A1 Mar. 5, 2009

Related U.S. Application Data

(60) Provisional application No. 60/966,652, filed on Aug. 29, 2007.

(51) Int. Cl.
*H04L 12/403* (2006.01)
(52) U.S. Cl. .................. 370/450; 370/337; 370/347
(58) Field of Classification Search .................. 370/331, 370/245, 235, 265–269, 335–339, 346–350, 370/400–427, 450–451; 455/450–451, 426
See application file for complete search history.

(56) References Cited

U.S. PATENT DOCUMENTS

| 6,108,551 | A * | 8/2000 | Lehmusto et al. ............ 455/450 |
| 6,768,727 | B1 * | 7/2004 | Sourour et al. ............... 370/335 |
| 6,965,851 | B2 * | 11/2005 | Tillotson ........................ 703/13 |
| 2005/0282494 | A1 * | 12/2005 | Kossi et al. .................. 455/41.2 |
| 2007/0297366 | A1 * | 12/2007 | Osann ........................... 370/331 |
| 2008/0013606 | A1 * | 1/2008 | Boariu et al. ................. 375/211 |
| 2008/0123582 | A1 * | 5/2008 | Maekawa ...................... 370/315 |
| 2009/0225658 | A1 * | 9/2009 | Rezvani et al. ............... 370/241 |

FOREIGN PATENT DOCUMENTS

| EP | 1 119 137 A1 | 7/2001 |
| EP | 2 169 840 A1 | 3/2010 |
| GB | 2 288 101 A | 10/1995 |
| WO | WO 2008/073650 A1 | 6/2008 |

OTHER PUBLICATIONS

International Search Report and Written Opinion mailed Jan. 8, 2009 for PCT Application No. PCT/US2008/010157.
Dong, Lu and Ingram, Mary Ann, "Beam Selection Algorithm Based on PTR Metric and Its Synchronization Performance," Proceedings of the Radio and Wireless Conference (RAWCON '03), Aug. 10-13, 2003, pp. 115-118.
Chu, Shao-Hua; Lin, Hsin-Piao; and Lin, Ding-Bing, "Performance Enhancement by Using Switch-Beam Smart Antenna in 802.11a WLAN System," IEEE/ACES International Conference on Wireless Communications and Applied Computational Electromagnetics, 2005, Apr. 3-7, 2005, pp. 1001-1005.
Examination Report dated Nov. 21, 2011 for GB Application No. GB1003329.8, 3 pages.

* cited by examiner

*Primary Examiner* — Pao Sinkantarakorn
*Assistant Examiner* — Iqbal Zaidi
(74) *Attorney, Agent, or Firm* — Moser Taboada

(57) ABSTRACT

A method and apparatus for WiFi long range radio coordination is described. In one embodiment, a method for facilitating radio coordination in order to prevent simultaneous exchanges of data includes processing status information associated with a first radio and a second radio within a node and scheduling signal communications of the first radio and second radio based on the status information to avoid interference between the first radio and the second radio.

11 Claims, 4 Drawing Sheets

METHOD AND APPARATUS FOR WIFI LONG RANGE RADIO COORDINATION

CROSS-REFERENCE TO RELATED APPLICATIONS

This application claims benefit of U.S. provisional patent application Ser. No. 60/966,652, filed Aug. 29, 2007, which is herein incorporated by reference.

BACKGROUND OF THE INVENTION

1. Field of the Invention

Embodiments of the present invention generally relate to network communications. More particularly, the present invention relates to a method and apparatus for WiFi long range radio coordination.

2. Description of the Related Art

Humans communicate with each other using various networking technologies. 802.11 represents a set of wireless networking standards that was promulgated by the Institute of Electrical and Electronics Engineers (IEEE). The 802.11 family (i.e., 802.11 legacy, 802.11g, 802.11n, and the like) includes multiple over-the-air modulation techniques that all use the same basic protocol. The 802.11 family facilitates the transmission and reception of data between two or more computers (e.g., servers, laptops, and the like), networking devices (e.g., adapters, gateways, routers, access points, and the like) and/or mobile devices (e.g., Bluetooth devices, Personal Desktop Assistants, mobile phones, and the like). WiFi is used to describe a networking interface of a mobile computing device that is coupled to a wireless local area network built on 802.11.

The wireless local area network may also include an access point between the mobile computing device and higher tiers of the network (e.g., a gateway, a backhaul device, a backbone network, and the like). The access point may use a radio connected with an antenna to communicate with computers, mobile devices, and/or other access points at short distances. The antenna may be omnidirectional (i.e., an antenna system which radiates power uniformly in one plane with a directive pattern shape in a perpendicular plane) or directional (i.e., an antenna which radiates greater power in one or more directions allowing for increased performance on transmit and receive and reduced interference from unwanted sources). Due to the deficiencies of the omnidirectional antenna, any access point using the antenna has a limited coverage area. An access point using one or more directional antennas may require multiple radios to achieve 360° of coverage.

Multiple radios, however, can cause interferences between the radios as they attempt to transmit and receive data at the same time. Interferences may occur despite the fact that the radios operate at different frequencies. An access point using multiple radios typically lacks adequate adjacent and/or alternate channel rejection and sufficient physical isolation and filtering between the radios. Due to the fact that there are only three non-overlapping channels in the 2.4 GHz ISM band that supports an 802.11 protocol signal, multiple radios capable of adequate adjacent channel rejection would still be unable to achieve a sufficient increase in antenna gain.

A typical access point for a WiFi-enabled network, for example, transmits at or around 17 dBM, which may be increased in certain cases to 30 dBm. Receptions at lower modulations (i.e., longer range links) typically occur down to −90 dBm. Therefore, up to 120 dB of isolation may be needed between the antenna sectors to permit simultaneous signal reception and transmission. Adjacent channel rejection from a number of chips may produce 30 dB, and the sectors may have 50 dB of physical isolation. As a result, 40 dBm of interference may exist between adjacent channels/sectors.

Hence, there is a need for a method and apparatus for coordinating WiFi long range radios. This is particular important for asynchronous 802.11 technologies because multiple radios enable signal reception at any of the antennas given the fact that 802.11 stations can transmit at any time and cause simultaneous signal transmission and reception at a given node.

SUMMARY OF THE INVENTION

Embodiments of the present invention comprise a method and apparatus for WiFi long range radio coordination within a node including coupling with status information of a first radio and delaying a second radio until the first radio halts. The method and apparatus may also include determining if the first radio is communicating data.

Embodiments of the present invention further comprise a node for transmitting and receiving data, a coordination module, within the node, for coupling with status information of a first radio, determining at least one of a transmission or a reception at the first radio and delaying a second radio until the first radio halts. Other embodiments of the present invention may include more than two radios.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following detailed description of various embodiments of the present invention, numerous specific details are set forth to provide a more thorough description of embodiments of the invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

The described method and apparatus coordinates one or more radios used by a node, such as an access point, coupled to a network. It will be apparent to those skilled in the art that the coordination of multiple radios of the node reduces and/or prevents interference between the radios and enables utilization of multiple directional antennas.

Figure 1:
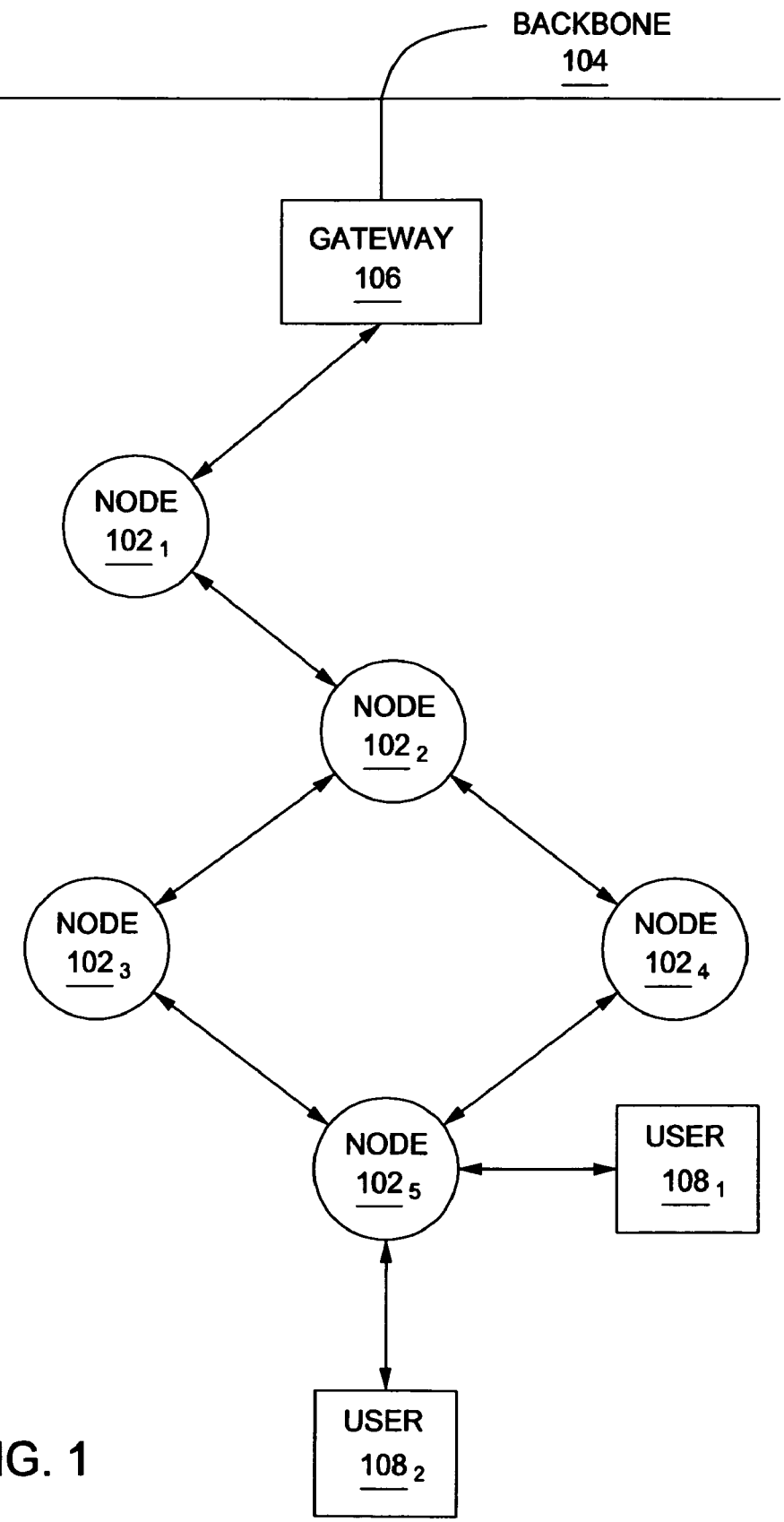
FIG. 1 is a block diagram of an exemplary embodiment of a network in accordance with one or more embodiments of the present invention.

FIG. 1 is a block diagram of an exemplary embodiment of a network 100 in accordance with one or more embodiments of the present invention. The network 100 includes nodes 102 (i.e., illustrated as node $102_1$, $102_2$, $102_3$, $102_4$ and $102_5$), a backbone 104, a gateway 106, and users 108 (i.e., illustrated as user $108_1$, and $108_2$). It is appreciated that each node may be coupled to one or more users. In one embodiment, the network 100 may be a mesh network.

The network 100 comprises a communication system that connects one or more nodes and/or stations by fiber optic and/or wireless links facilitated by various types of well-known network elements, such as hubs, access points, switches, routers, gateways and the like. The nodes 102 are generally compliant with any of the 802.11 technologies (e.g., access points, stations, adapters and the like). The nodes 102 may be arranged in a mesh topology or any other network topology. The embodiments of the invention are applicable to any topology wherein a node may potentially simultaneously receive and transmit a signal.

The backbone 104, generally, is a data path or set of data paths for the exchange of information between different networks or sub-networks (e.g., local area networks). The backbone 104 may join two or more networks and form a wide area network. The gateway 106 is a type of access point that serves as an entry point and an exit point on the network 100. The gateway 106 typically connects the network 106 to another network through a networking medium (e.g., landline, satellite, over-the-air, and the like).

As such, the network 100 connects the user 108 (e.g., a computer, a mobile device, a Personal Desktop Assistant (PDA), peripheral devices, and the like) to a much larger distribution system (e.g., Internet) according to one embodiment. In the distribution system, such as a plurality of networks employing one or more 802.11 technologies, the backbone 104 couples the network 100 to the plurality of networks using the gateway 106.

Figure 2:
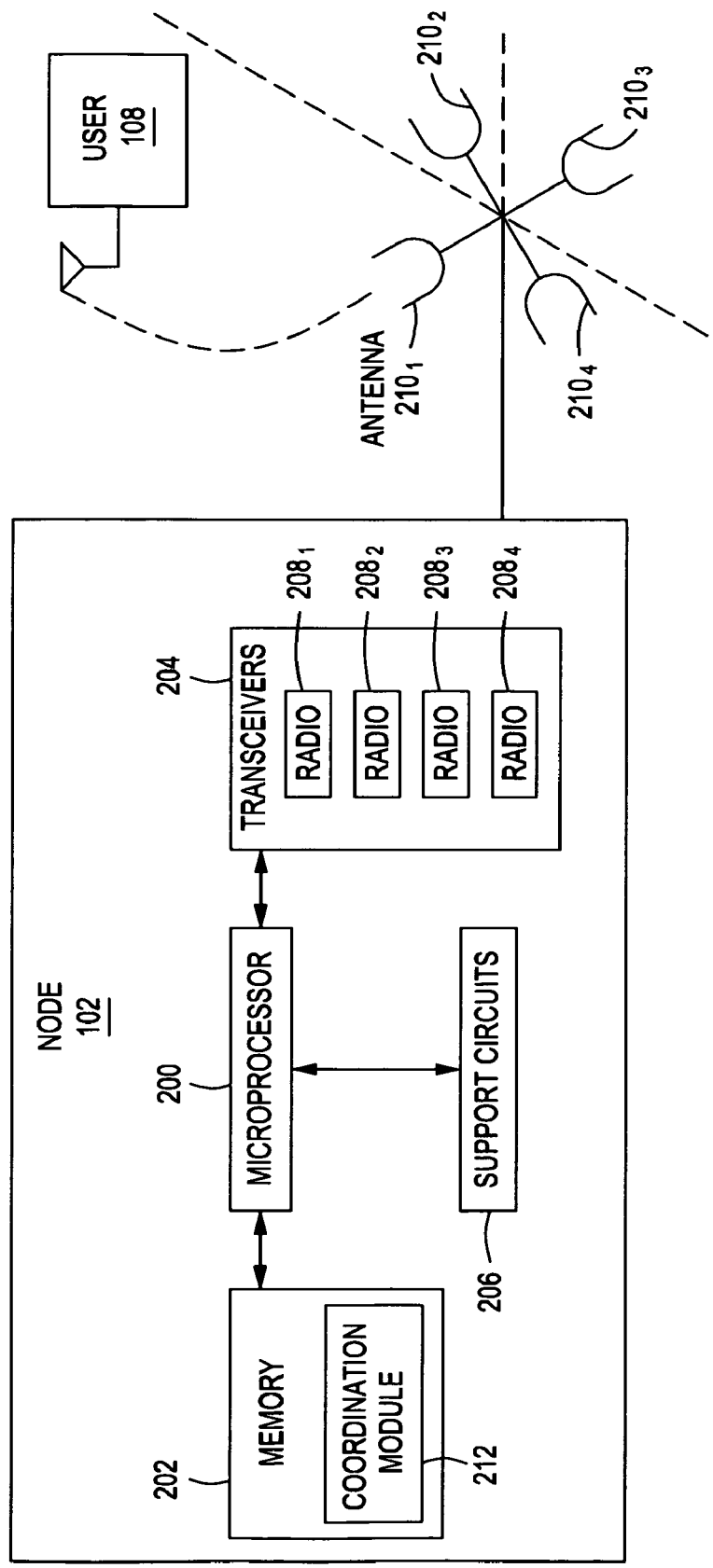
FIG. 2 is a block diagram of an exemplary embodiment of a node coupled to the network and the user in accordance with one or more embodiments of the present invention.

FIG. 2 is a block diagram of an exemplary embodiment of the node 102 coupled to the network 100 and the user 108 in accordance with one or more embodiments of the present invention. It is well understood that although FIG. 2 illustratively refers to one user 108, communications between multiple users are enabled by various embodiments of the present invention. The node 102 includes a microprocessor 200, a memory 202, a transceiver 204, and support circuits 206.

The microprocessor 200 comprises logic circuitry such as a Central Processing Unit (CPU). The microprocessor 200 generally facilitates Input/Output processing, display creation, communication within the node 102 and communication with the network 100. The support circuits 206 may include cache, power supplies, clock circuits, data registers, I/O interfaces, network interfaces, and the like. The support circuits 206 support the functionality of the microprocessor 200 or another processor in the node 102.

A receiver and a transmitter of a radio, generally, form the transceiver 204. Generally, the radio is any electronic circuit capable of producing, detecting and/or processing electromagnetic signals from an antenna. The antenna is typically a transducer designed to transmit or receive radio waves (i.e., electromagnetic waves within the Radio Frequency (RF) range). In other words, the antenna converts radio frequency electrical currents into electromagnetic waves and vice versa.

According to one embodiment, the transceiver 204 includes a plurality of radios 208 (i.e., illustrated as radio $208_1$, $208_2$, $208_3$ and $208_4$) that are each coupled to one of a plurality of antennas 210 (i.e., illustrated as antenna $210_1$, $210_2$, $210_3$ and $210_4$). Each one of the radios 208 includes a receiver and a transmitter. In this embodiment, antennas 210 support signal transmissions and receptions of data at the radios 208 by generating a coverage area for radio frequencies (i.e., each antenna is directional and covers 90 degrees).

The memory 202 is coupled to the microprocessor 200 through one or more data paths. The memory 202 is sometimes referred to as main memory and may be used as cache memory or buffer memory. The memory 202 may comprise random access memory, read only memory, removable disk memory, flash memory, and various combinations of these types of memory. The memory 202 stores various drivers, routines, libraries, operating systems, applications and other software used by the microprocessor 200. In one embodiment, the memory 202 stores various software packages including a coordination module 212. The coordination module 212, as explained below, may improve the coverage area of the node 102 by regulating signal transmissions and receptions of data at the radios 208.

As FIG. 2 illustrates, the user 108 cooperates with the node 102 to exchange data through the network 100 using the coordination module 212, the radios 208, and the antennas 210. In operation, the user 108 transmits data to the any one of radios 208 by sending radio waves to the attached antenna of the antennas 202 having the coverage area of interest. When the node 102 accesses the memory 202 and executes the coordination module 212, the radios 208 operate harmoniously. In one embodiment, the coordination module 212 effectively presents one single radio to the upper layers of an 802.11-based communication protocol.

The coordination module 212 seeks to avoid one radio/antenna pair from interfering with communications at another radio/antenna pair by scheduling transmissions and receptions of data at the radios 208, thereby avoiding simultaneous exchanges of data. For example, interferences may occur if two radios are close to each other such that their coverage areas overlap. In one embodiment, only one radio is allowed to transmit or receive a data frame at a time. Accordingly, the radios 208, while including more than one radio, become virtualized into one unitary radio by the coordination module 212.

In operation, if a second radio wishes to transmit a data frame while a first radio is receiving or transmitting another data frame, then the coordination module 212 delays transmission at the second radio until the first radio either finishes or halts the reception or transmission. The fact that the second radio is currently receiving or transmitting becomes known to the second radio by coupling with status information of the first radio through various embodiments of the present invention, as described below. In one embodiment, the coordination module 212 may poll status information from one or more of radios 208 before transmitting the data frame at the second radio. In another embodiment, the coordination module 212 may generate and/or communicate an internal event having status information to one or more of radios 208 when the first radio commences reception or transmission. Thus, in either embodiment, the second radio does not transmit the data frame while the first radio is transmitting or receiving because it may diminish the performance of the node 102 by interfering with the first radio and/or other radios.

In another embodiment in accordance with the present invention, the coordination module 212 seeks to avoid commencing a reception at one radio while another radio is transmitting. If the second radio wishes to receive a data frame during the same time period in which the first radio plans to transmit a data frame, then the coordination module 212 delays the reception at the second radio until the first radio either finishes or halts the transmission. This is accomplished using a coordination message in any format compliant with an 802.11 technology (e.g., an 802.11g protection frame, a CTS (clear to send) message, and the like). In this embodiment, the coordination message indicates that a specific communication channel is being used by the first radio to transmit the data frame for a particular time period. The node 102 sends the coordination message to itself and/or other nodes using radios 208.

The coordination message is sent by the node 102 to itself because one of the radios 208 may not know that another of the radios 208 is currently transmitting. In the case of multiple directional antennas, one radio/antenna pair may be oriented in such a manner that it cannot hear or detect a transmission at another radio/antenna pair.

Figure 3:
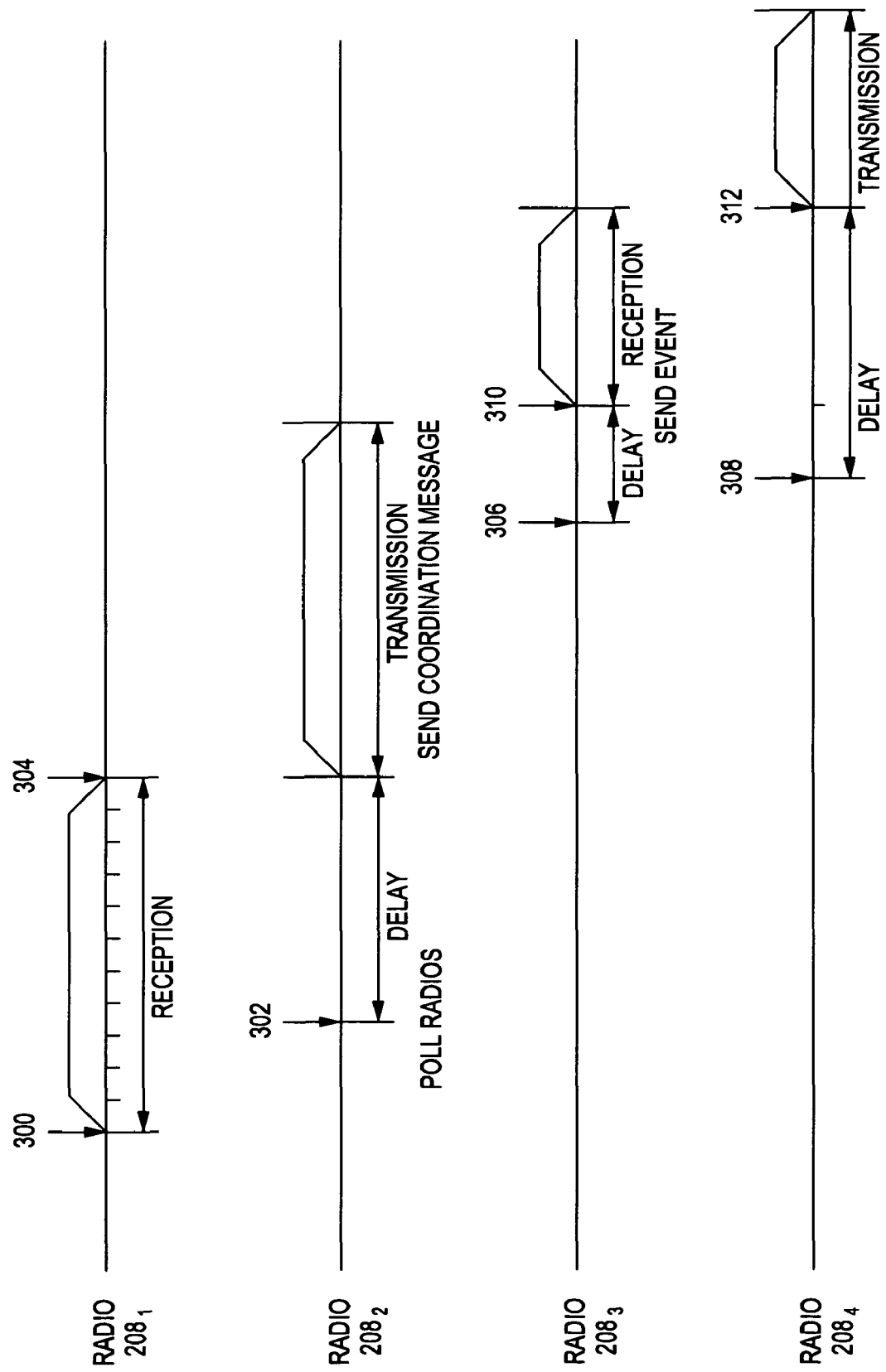
FIG. 3 is a timing diagram depicting coordination of one or more radios within an exemplary embodiment of the node in accordance with one or more embodiments of the present invention.

FIG. 3 is a timing diagram depicting coordination of radios 208 within an exemplary embodiment of the node 102 in accordance with one or more embodiments of the present invention. Specifically, FIG. 3 illustrates timings of transmissions and receptions of signals at the radios 208 as scheduled by the coordination module 212. The timings represented in the diagram are in chronological order and any space between two timings indicates that an amount of time has elapsed.

At time 300, the radio $208_1$ commences signal reception of a data frame. After a period of time elapses, the radio $208_2$ desires to transmit another data frame during signal reception at the radio $208_1$. In one embodiment, at time 302, the coordination module 212 polls the radio $208_1$, $208_3$, and $208_4$ and accesses status information of each radio. The status information of the radio $208_1$ indicates that the radio is busy receiving a data frame. Therefore, the coordination module 212 delays the signal transmission of the another data frame by the radio $208_2$ for a time period represented by a space between time 302 and time 304.

At time 304, the radio $208_1$ finishes or otherwise halts the signal reception of the data frame, and the radio $208_2$ commences signal transmission of the another data frame as directed by the coordination module 212, according to one embodiment. In this embodiment, the radio $208_1$, generates and/or sends an internal event having status information to the radio $208_2$ when the signal reception finishes or otherwise halts. In another embodiment, the radio $208_2$ polls the radio $208_1$ on or after time 304 and discovers that the signal transmission has halted or otherwise finished. It is appreciated that the signal transmission at the radio $208_2$ may commence after the radio $208_1$ finishes or halts signal reception as well as simultaneously. In either case, the radio $208_2$ commences signal transmission while no other radio is receiving or transmitting.

After a period of time elapses, the radio $208_3$ desires to receive a data frame. In yet another embodiment, the coordination module 212 avoids commencing signal reception at another radio during signal transmission at the radio $208_2$ by communicating a coordination message to hosts of the radios $208_1$, $208_3$ and $208_4$ at time 304. The coordination message informs the hosts that radio $208_2$ will be using a specific communication channel to transmit the another data frame for a particular time period. In one embodiment, the coordination message silences the other radios for the particular time period so that radio $208_2$ can transmit. As a result, at time 306, reception at the radio $208_3$ is delayed for the time period indicated by the coordination message frame by preventing the host from transmitting to the radio $208_3$.

At time 308, after some time elapses from time 306, transmission at the radio $208_4$ is also delayed because the coordination module 212 avoids simultaneous signal transmissions by the radios 208. In accordance with one or more embodiments of the present invention, the coordination module 212 at time 308 accesses status information by polling the radios 208 and/or utilizing internal events having status information from the radios 208. Then, the coordination module 212 would delay the radio $208_4$ until after transmission at the radio $208_2$ finishes or otherwise halts. The operations described above may occur even if the radio $208_2$ does not send the coordination message.

At time 310, transmission at the radio $208_2$ halts and reception of a data frame at the radio $208_3$ commences. As explained above, time 310 may correspond to the end of the time period indicated in the coordination message frame. Time 310 may also be the moment when the radio $208_2$ has transmitted an entire data frame or a portion thereof. Alternatively, the radio $208_4$ may commence transmission of a data frame at time 310. In one embodiment, such transmission may be delayed even further in order to allow the hosts enough time to receive one or more data frames from the other radios. Nonetheless, the radio $208_3$ transmits an internal event having status information to the coordination module 212 according to one embodiment.

At time 310, however, the radio $208_4$ still desires to transmit a data frame. In one embodiment, the coordination module 212 evaluates status information within the internal event sent by the radio $208_2$. The status information shows that reception at the radio $208_2$ began at time 310. For this reason, the coordination module 212 delays transmission of the data frame at the radio $208_4$ until reception at the radio $208_3$ finishes or otherwise halts. At time 312, the radio $208_3$ stops receiving and the radio $208_4$ commences transmission of the data frame. For the time period after time 312, the coordination module 212 continues to schedule signal reception and transmission at the radios 208.

Figure 4:
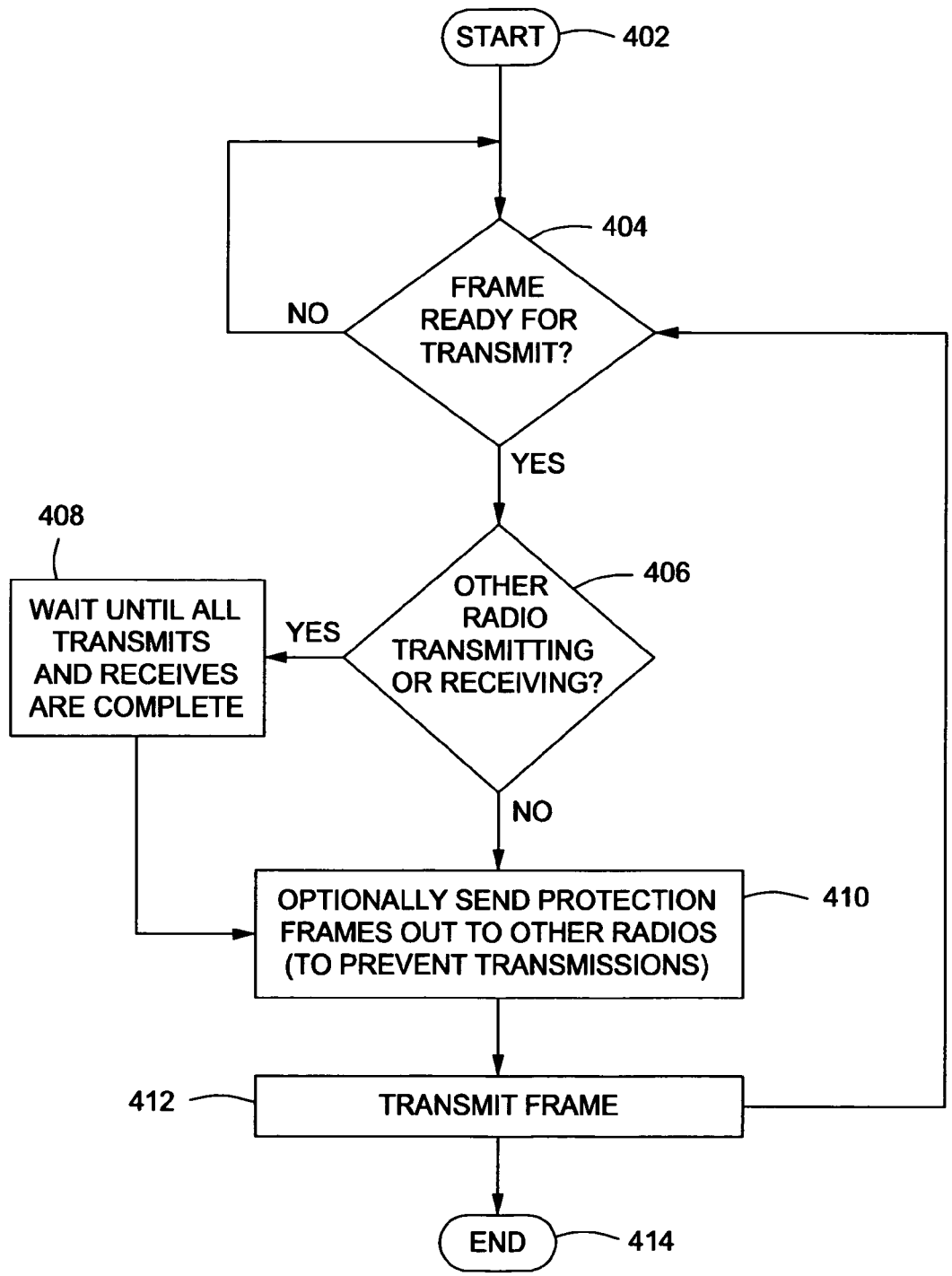
FIG. 4 is a flow diagram depicting an exemplary embodiment of method of coordinating one or more radios in the node in accordance with one or more embodiment of the present invention.

FIG. 4 is a flow diagram depicting an exemplary embodiment of method 400 for coordinating one or more radios 208 in the node 102 in accordance with one or more embodiments of the present invention. In one embodiment, the method 400 represents a number of operations of the coordination module 212.

The method 400 begins at step 402 and proceeds to step 404. At step 404, a determination is made as to whether a data frame is ready to be transmitted by a first radio. The method 400 repeats steps 404 until the data frame is ready for transmission and, then proceeds to step 406. At step 406, a determination is made as to whether any other radio is currently transmitting or receiving. If another radio is currently receiving or transmitting, then the method 400 proceeds to step 408. If no other radio is currently receiving or transmitting, then the method 400 proceeds to step 410. At step 408, the method 400 waits until each and every reception and transmission is completed.

At step 410, the method 400 performs the optional operation of sending protection frames (e.g., 802.11g protection frames) out to the hosts of the other radios in order to prevent transmission to those radios. The protection frame effectively silences the other radios. At step 412, the data frame is transmitted by the first radio. At step 414, the method 400 ends.

The node 102 practices the method 400 using the coordination module 212 to improve its performance by avoiding interferences between the radios 208. For example, transmissions from one radio could disrupt receptions to another radio and vice versa. By mitigating the detrimental effects of such interferences, multiple directional antennas are enabled for use by the node 102. In one embodiment, the node 102 generates an enhanced coverage area using multiple directional antennas.

While the foregoing is directed to embodiments of the present invention, other and further embodiments of the invention may be devised without departing from the basic scope thereof, and the scope thereof is determined by the claims that follow.

The invention claimed is:

1. A method for facilitating radio coordination in order to prevent simultaneous exchanges of data, comprising:
processing status information associated with a first radio and a second radio within a node, wherein the status information comprises at least one of a start time for transmission or reception of data corresponding to at least one of the first radio or the second radio, wherein processing the status information further comprises polling at least one of the first radio or the second radio in order to access the status information; and
scheduling signal communications of the first radio and second radio based on the processed status information to avoid interference between the first radio and the second radio, wherein scheduling the signal communications of the first radio and second radio further comprises (i) when the second radio is not communicating data as indicated by the processed status information, commencing at least one of a transmission or a reception of a frame at the first radio, and (ii) generating a coordination message to be transmitted from the first radio to the second radio to prevent a signal transmission at the second radio during a signal reception at the first radio.

2. The method of claim 1, wherein scheduling the signal communications of the first radio and second radio further comprises when the second radio is communicating data as indicated by the status information, delaying at least one of a transmission or a reception of a frame at the first radio until the second radio halts.

3. The method of claim 1, wherein scheduling the signal communications of the first radio and second radio further comprises waiting for signal communications at the second radio to halt before at least one of a transmission or a reception of a frame at the first radio.

4. The method of claim 1, wherein scheduling the signal communications of the first radio and second radio further comprises delaying signal communications at the first radio until at least one of a transmission or a reception of a frame at the second radio finishes.

5. The method of claim 1, wherein processing the status information further comprises instructing at least one of the first radio or the second radio to transmit an internal event having the status information.

6. A node for facilitating radio coordination in order to prevent simultaneous exchanges of data, comprising:
a transceiver, comprising at least two radios; and
a coordination module for scheduling signal communications of the at least two radios based on status information to avoid interference between the at least two radios, wherein the coordination module commences at least one of a transmission or a reception of a frame at a first radio of the at least two radios, wherein the coordination module performs at least one of polling the at least two radios in order to access the status information or instructing the at least two radios to transmit an internal event having the status information, wherein the coordination module generates a coordination message to be transmitted from a first radio of the at least two radios to a second radio of the at least two radios to prevent a signal transmission at the second radio during a signal reception at the first radio, and wherein the status information indicates that a second radio of the at least two radios is not communicating data, and wherein the status information comprises at least one of a start time for transmission or reception of data corresponding to at least one of the first radio or the second radio.

7. The node of claim 6, wherein the coordination module delays at least one of a transmission or a reception of a frame at a first radio of the at least two radios until a second radio of the at least two radios halts, wherein the status information indicates that the second radio of the at least two radios is communicating data.

8. The node of claim 6, wherein the coordination module delays signal communications at a first radio of the at least two radios until at least one of a transmission or a reception of a frame at a second radio of the at least two radios finishes.

9. The node of claim 6, wherein each node of the at least two radios is coupled to a different antenna.

10. A system facilitating radio coordination in order to prevent simultaneous exchanges of data, comprising:
a plurality of nodes for receiving and transmitting at least one frame of data, wherein each node comprising:
a transceiver, comprising at least two radios, and
a coordination module for processing status information associated with the at least two radios to schedule signal communications of the at least two radios based on the status information to avoid interference between the at least two radios, wherein the coordination module polls the at least two radios in order to access the status information, and wherein the coordination module delays signal communications at a first radio of the at least two radios until at least one of a transmission or a reception of a frame at a second radio of the at least two radios finishes, wherein the coordination module generates a coordination message to be transmitted from a first radio of the at least two radios to a second radio of the at least two radios to prevent a signal transmission at the second radio during a signal reception at the first radio, and wherein the status information comprises at least one of a start time for transmission or reception of data corresponding to at least one of the first radio or the second radio and;
an access point coupled to the plurality of nodes for routing the signal communications of the at least two radios.

11. The system of claim 10, wherein the coordination module instructs the at least two radios to transmit an internal event having the status information.

* * * * *